United States Patent [19]

Tanner

[11] Patent Number: 4,532,512

[45] Date of Patent: Jul. 30, 1985

[54] OMNIDIRECTIONAL APPROACH SLOPE INDICATOR SYSTEM

[76] Inventor: Jesse H. Tanner, 261 Taylor Ave., Northwest, Renton, Wash. 98055

[21] Appl. No.: 443,289

[22] Filed: Nov. 22, 1982

[51] Int. Cl.³ .............................. G08G 5/00; B64F 1/20
[52] U.S. Cl. .................................... 340/950; 340/955; 340/954
[58] Field of Search .............. 340/946, 950, 953, 954, 340/955, 982; 362/62, 35; 244/114 R

[56] References Cited

U.S. PATENT DOCUMENTS

| | | | |
|---|---|---|---|
| 1,797,394 | 3/1931 | Bassett | 340/953 |
| 1,874,214 | 8/1932 | Werner | 340/950 |
| 2,475,256 | 7/1949 | Saint | 340/950 |
| 2,498,294 | 2/1950 | Pennow | 340/950 |
| 3,305,826 | 2/1967 | Kaplan | 340/950 |
| 3,465,285 | 9/1969 | Simons | 340/950 |
| 3,706,968 | 12/1972 | Turner | 340/955 |

Primary Examiner—James J. Groody
Attorney, Agent, or Firm—Seed and Berry

[57] ABSTRACT

An omnidirectional approach slope indicator unit for heliports is disclosed. The unit may include two oppositely directed light beam generators secured to a rotatable shaft, the light beam generators generating light beams of differing colors to alert an approaching aircraft of his position relative to the glide slope indicated by the light beams.

7 Claims, 4 Drawing Figures

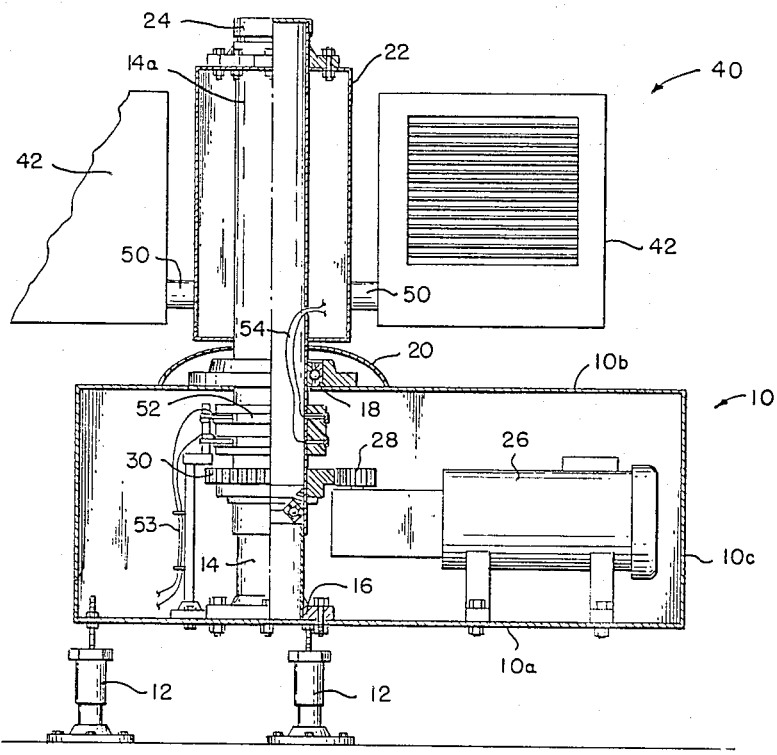
FIG. 3
FIG. 4
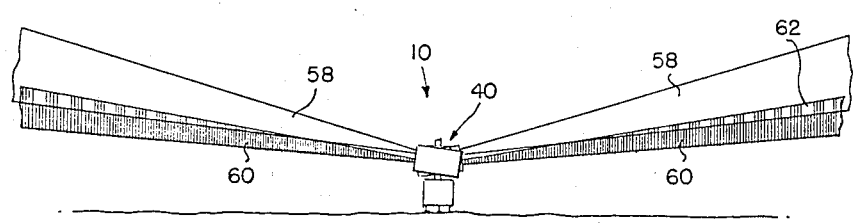

OMNIDIRECTIONAL APPROACH SLOPE INDICATOR SYSTEM

DESCRIPTION

1. Technical Field

This invention relates to an omnidirectional, visual approach slope indicator for use at heliports or elsewhere.

2. Background Art

It is essential that approaching helicopters intending to land at a heliport maintain the craft at the appropriate angle with respect to the intended point of touchdown. This line of approach is often referred to as the glide slope or glide path, and should be maintained substantially constant within relatively narrow limits in order for the craft to properly touch down within the confines of the helicopter pad. It is also desirable to be able to approach a helicopter pad from any direction and be able to ascertain the proper glide path approaching the helicopter pad from any direction.

DISCLOSURE OF INVENTION

It is a primary object of this invention to provide an omnidirectional, visual approach slope indicator system for use at heliports or other locations during visual flight rules weather conditions—day or night.

It is a further object of this invention to provide an omnidirectional, visual approach slope indicator system including two light-generating units positioned to project light beams in different directions, the light-generating unit generating partially overlapping beams of different colors and each mounted to a central rotating shaft powered by suitable power means.

The omnidirectional, visual approach slope indicator unit includes a light-generating unit having means for generating a first beam of light of one color in one direction and a second light-generating unit having means for generating a second beam of light of a second color partially overlapping and above the first beam, the units including beam directing means to form the first and second beams of light so that the lower edge of the second beam overlaps the upper edge of the first beam, a frame for supporting the unit, and means for rotatably mounting the unit on the frame for rotation up to 360°.

BRIEF DESCRIPTION OF THE DRAWINGS

FIG. 3 is a sectional view along section line 3—3 of FIG. 1 of the omnidirectional unit; and FIG. 4 is a side view of the unit FIG. 1 illustrating the apparent beam pattern emanating from the unit that results as the unit is rotated.

BEST MODE FOR CARRYING OUT THE INVENTION

Figure 1:
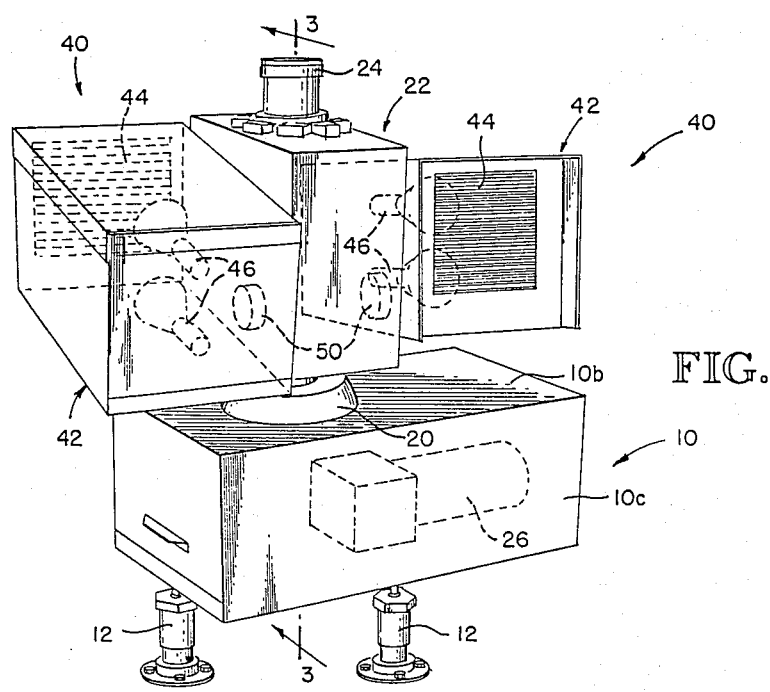
FIG. 1 is a perspective view of the omnidirectional, visual approach slope indicator.

Referring to FIGS. 1 and 3, a housing 10 having a bottom wall 10a, a top wall 10b, and sidewalls 10c is supported on vertically adjustable pads 12 used to level the unit relative to the surface on which the unit is placed. A central shaft 14 is vertically oriented and supported for rotation in lower bearings 16 and upper bearings 18. Bearings 16 are secured to the lower wall 10a of the housing and bearings 18 secured to the upper wall 10b of the housing 10. The shaft extends through an opening in the top wall 10b. A weather shield 20 covers the bearings 18, as illustrated in FIG. 1, to keep the unit dry.

The upper part of the shaft 14a is enclosed in a housing 22, best seen in FIG. 1. The shaft extends through an opening in the upper part of the housing 22 and is covered with a cap 24 at its upper end, the cap bolted or otherwise secured to top of the enclosure 22. Referring to FIG. 3, a motor 26 secured to bottom wall 10a has its output shaft operably connected to gear 28, which meshes with and drivingly engages gear 30, secured to shaft 14. The motor 26 may be a fixed or variable rpm motor for varying the rate of rotation of the shaft.

Light-generating units 40 are secured on each side of the enclosure 22, as illustrated in FIG. 1, for rotation with the enclosure and central shaft 14. Reference is made to U.S. Pat. No. 4,170,767, in the name of the applicant herein. In particular, reference is made to FIG. 5 and the disclosure of a visual approach system providing only glide slope information for guiding an aircraft to a runway. The disclosure of this patent is incorporated by reference. Each of the light-generating units of FIG. 1 includes an enclosure 42 open at one end, with the open end covered with baffles or louvers 44 to direct light beams issuing from the respective units. Within each unit is mounted one or more high-intensity lamps 46, such as, for example, 120-volt, 1000-watt tungsten halogen lamps. Preferably, two lamps are mounted directly above one another within each light-generating unit. A color filter is placed in front of, preferably, the lower lamp, and a clear, focusing filter in front of the upper lamp. Generally, an "aviation red" filter is used for the lower lamp. Access to the lamps may be gained through the rear wall of the unit, which is removable. The two light-generating units 40 are secured to the central enclosure 22 by a swivel attachment 50, allowing the angle of each of the units to be adjusted relative to the surface on which the unit is sitting-generally, an angle ranging from 2° to 10° or more. Power to the lamps is provided through a slip ring 52 mounted on the central shaft 14, the incoming power lines 53 connected through the slip ring to lines 54, which directly connect to the respective lamps.

Figure 2:
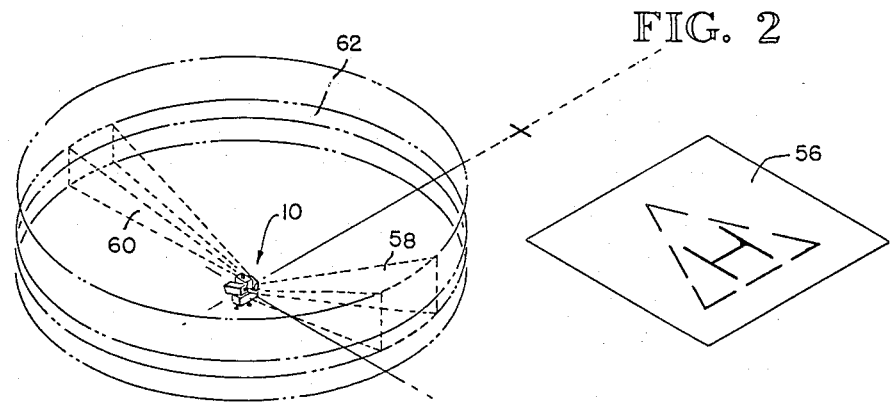
FIG. 2 is a perspective view of the omnidirectional unit in relation to a helicopter pad.

Referring to FIG. 2, illustrating a heliport installation, the unit 10 is placed adjacent the helipad 56, generally about 50 feet to the left of and 50 feet beyond the helipad. The unit may be placed at other desired locations relative to the helipad if desired. Beam 58, preferably red, emanates from one unit and sweeps an area from about ground level up to the preferred glide slope. Beam 60, preferably white, emanates from the other unit and sweeps an area which overlaps the upper edge of beam 58 (designated area 62) up to a predetermined angle. Rotation of the two light-generating units creates the illusion of flashing to an operator of a helicopter approaching the units.

Referring to FIG. 4, the lower beam from the one light-generating unit generally passes through a red filter. The upper beam from the other light-generating unit generally passes through a clear, light-focusing filter. The beam from each of the units is focused such that the upper edge of the lower beam 58 overlaps the lower edge of the upper beam 60 as the unit is rotated (see FIG. 2). The approach or glide path is indicated by the crossed beams portion 62, where the operator approaching the heliport sees an illusion of sequential beams of different colors, generally red and white, caused by rotation of the units. If the operator of the aircraft is above the glide slope set by the unit, he sees only the upper beam 60, which is generally white. If he is below the glide path set by the unit, he sees only the lower beam 58, which is generally red. On the proper glide slope, the operator will see a sequentially flashing red and white light beam.

FIG. 4 illustrates the apparent beam pattern which results when the unit is rotated.

The unit provides complete guide slope information simultaneously in all directions. It may also be set to cover any smaller portion of 360°. The glide slope is adjustable. The precise rotating signal beams have a range of up to 20 miles at night, making the unit useful as a heliport locating beacon as well as an approach slope indicator. The unit also provides a signal reference/aiming point for the heliport without the pilot having to search for it.

The simplicity of the system and the long lamp life result in a system of high reliability and minimum maintenance.

I claim:

1. An omnidirectional, visual approach slope indicator comprising:
    a first light-generating unit including means for generating a first beam of a light of a first color in one direction and a second light-generating unit including means for generating a second beam of light of a second color in an opposite direction, the units including beam directing means to cause the lower edge of the light beam of the second unit to overlap the upper edge of the light beam of the first unit along a predetermined angle for the glide slope,
    a frame for supporting the units on a surface, and
    means for rotatably mounting the units on the frame for rotation up to 360°.

2. The slope indicator of claim 1 wherein the first and second light-generating units are mounted to project light beams at 180° from each other.

3. The slope indicator of claim 1, including means to adjust the angle of each of the light-generating units relative to the surface on which the units are mounted.

4. The slope indicator of claim 1 wherein rotation of the units creates the illusion of sequential flashing of the first and second beams of light so that an operator of an aircraft approaching the units sees a flashing light of the first color if below the glide path, a flashing light of the second color if above the glide path, and alternate flashing of the first and second colors if on the glide path.

5. The slope indicator of claim 1 wherein the means for rotating the light-generating units includes a central, vertically oriented shaft rotatably supported on the mounting frame, the light-generating units secured for rotation with the central shaft, and power means operably connected to the shaft for rotating the same.

6. The slope indicator of claim 1 wherein the means for generating the first and second beams of light includes high-intensity light sources, a slip ring on the central shaft, wiring operably connecting a source of electrical energy through the slip ring to the light sources to deliver electrical energy thereto.

7. An omnidirectional approach slope indicator for use at heliports during visual flight rules weather conditions—day or night, comprising:
    two light-generating units, the first unit including means for generating a first beam of light of a first color and the second unit including means for generating a second beam of light of a second color above the first beam, the units including beam directing means to cause the lower edge of the second or upper beam of light to overlap the upper edge of the first beam of light to indicate a proper glide slope, means adjustably connecting the two light-generating units at positions such that the light beam from the first light-generating unit is projected at 180° from the light beam of the second light-generating unit,
    a mounting frame for supporting the light-generating units, including a vertically oriented shaft rotatably supported on the mounting frame, with the light-generating units secured to rotate with the central shaft, and
    power means operably connected to the shaft for rotation of the same to create the illusion of sequential flashing of the first and second beams of light so that the operator of an approaching aircraft sees flashing lights of the first color if below the glide path, flashing lights of the second color if above the glide path, and alternate flashing of the first and second colors if on the glide path.

* * * * *